(12) United States Patent
Kawahara et al.

(10) Patent No.: US 6,941,002 B1
(45) Date of Patent: Sep. 6, 2005

(54) FINGERPRINT READING DEVICE AND METHOD THEREOF

(75) Inventors: Yukito Kawahara, Chiba (JP); Hiroyuki Fujita, Chiba (JP); Tsutomu Matsuhira, Chiba (JP)

(73) Assignee: Seiko Instruments Inc., Chiba (JP)

( * ) Notice: Subject to any disclaimer, the term of this patent is extended or adjusted under 35 U.S.C. 154(b) by 380 days.

(21) Appl. No.: 09/634,243

(22) Filed: Aug. 8, 2000

(30) Foreign Application Priority Data

Aug. 11, 1999 (JP) .......................................... 11-227722

(51) Int. Cl.$^7$ ................................................ G06K 9/00
(52) U.S. Cl. ................................................ 382/124
(58) Field of Search ............................... 382/124, 125, 382/127, 115, 116, 315; 356/71; 283/68, 69; 345/173–178, 103, 104

(56) References Cited

U.S. PATENT DOCUMENTS

| | | | |
|---|---|---|---|
| 5,446,290 A | * | 8/1995 | Fujieda et al. ............... 250/556 |
| 5,869,791 A | * | 2/1999 | Young ..................... 178/20.01 |
| 6,191,410 B1 | * | 2/2001 | Johnson .................... 250/208.1 |
| 6,310,683 B1 | * | 10/2001 | Fujiwara et al. ............... 356/71 |

OTHER PUBLICATIONS

Patent Abstracts of Japan, publication No. 08–029620, publication date (of corresponding Japanese Application No. 06–181799) Feb. 2, 1996.

* cited by examiner

*Primary Examiner*—Mehrdad Dastouri
*Assistant Examiner*—Virginia Kibler
(74) *Attorney, Agent, or Firm*—Adams & Wilks

(57) ABSTRACT

A fingerprint reading system is provided, which is capable of enhancing versatility when actually used, increasing productivity and reducing costs. An illumination device emits the light from a rear surface side of an active matrix liquid crystal cell. A light guiding plate provided on a surface side of the active matrix liquid crystal cell, transmits the light coming from the rear surface side and deflects the light coming from the surface side toward one side end surface. A light receiving device provided on the side of one side surface of the light guiding plate receives the light exiting from this one side surface. A drive circuit makes the active matrix liquid crystal cell pinpoint-irradiate a fingerprint in contact with the light guiding plate by pinpointing with the light emitted from the illumination device and makes the light receiving device pinpoint-receive the light reflected by the fingerpoint, thereby obtaining an image of the fingerprint.

28 Claims, 2 Drawing Sheets

FINGERPRINT READING DEVICE AND METHOD THEREOF

BACKGROUND OF THE INVENTION

1. Field of the Invention

The present invention relates to a fingerprint reading device a method thereof.

2. Related Background Art

Some of the systems for authenticating an individual for the purpose of keeping confidentiality, etc. have hitherto used an ID number, a password and so on, however, it was not perfect to maintain the confidentiality because the ID number and the password might leak out. While on the other hand, a system using a fingerprint reading device is proposed as that capable of keeping the confidentiality at a much higher level.

There were hitherto proposed electrostatic capacity type fingerprint reading devices (Japanese Patent Application Laid-Open No. Hei4-231803, etc.) for detecting a fingerprint pattern by utilizing the fact that electrostatic capacities occurred between a group of electrodes arranged in a two-dimensional array and a finger touching on the electrode group through a dielectric substance layer differ corresponding to a ruggedness of the fingerprint. This type of fingerprint reading devices has been utilized.

Further, for example, there was proposed an optical fingerprint reading device using an image sensor such as CCD.

There was not, however, a well-designed application about what sort of apparatus incorporates such type of fingerprint reading device and how the fingerprint reading device is used, and very few fingerprint reading devices have been utilized. Moreover, in the case of the optical type, there arises a problem in which the costs are comparatively high and the structure is complicated.

SUMMARY OF THE INVENTION

It is a primary object of the present invention, which was devised under such circumstances, to provide a finger print reading device and a method thereof that are capable of enhancing a versatility when actually used, and reducing costs.

To accomplish the above object, according to a first aspect of the present invention, a fingerprint reading device is characterized in that it comprises an active matrix liquid crystal cell, an illumination device for emitting the light from a rear surface side of the active matrix liquid crystal cell, a light guiding plate, provided on a surface side of the active matrix liquid crystal cell, for transmitting the light coming from the rear surface side and deflecting the light coming from the surface side toward one side end surface, a light receiving device, provided on the side of one side surface of the light guiding plate, for receiving the light exiting from this one side surface, and a drive circuit for making the active matrix liquid crystal cell pinpoint-irradiate a fingerprint by pinpointing with the light emitted from the illumination device and making the light receiving device pinpoint-receive the light reflected by the fingerprint, and thereby obtaining an image of the fingerprint.

According to the first aspect of the invention, the finger print is pinpoint-irradiated with the light through the active matrix liquid crystal cell, and the reflected light is received through the light guiding plate, whereby the image of the fingerprint can be easily obtained.

According to a second aspect of the present invention, the fingerprint reading device according to the first aspect of the invention is characterized in that, the active matrix liquid crystal cell may serve also as a liquid crystal cell of a liquid crystal display device.

According to the second aspect of the invention, the pinpoint-irradiation of the light can be easily attained by making use of the liquid crystal cell of the liquid crystal display device.

According to a third aspect of the present invention, the fingerprint reading device according to the first aspect of the invention is characterized in that, the active matrix liquid crystal cell may be provided in superposition on at last a part of the liquid crystal cell of the liquid crystal display device.

According to the third aspect of the invention, the fingerprint reading sensor is provided integrally with the liquid crystal display device, and a back light of the liquid crystal display device can be used as an illumination device.

According to a fourth aspect of the present invention, the fingerprint reading device according to any one of the first through third aspects of the invention is characterized in that, the light receiving device may be a line sensor provided along the one side end surface of the light guiding plate.

According to the fourth aspect of the invention, the beams of reflected light are detected sequentially by the line sensor, thereby obtaining the image of the fingerprint.

According to a fifth aspect of the present invention, the fingerprint reading device according to any one of the first through third aspects of the invention is characterized in that, the light receiving device may be constructed of a light receiving element and a lens or a lens array for converging on the light receiving element the light exiting from the one side end surface of the light guiding plate.

According to the fifth aspect of the invention, the beams of reflected light area received sequentially by the photo diode, thereby obtaining the image of the fingerprint.

According to a sixth aspect of the present invention, a fingerprint reading method is characterized in that it comprises the steps of providing an active matrix liquid crystal cell, providing an illumination device for emitting the light from a rear surface side of the active matrix liquid crystal cell, providing a light guiding plate on a surface side of the active matrix liquid crystal cell, which transmits the light coming from the rear surface side and deflects the light coming from the surface side toward one side end surface, selectively pinpoint-irradiating a fingerprint touching on the surface of the light guiding plate through the active matrix liquid cell with the light coming from a rear surface side of the active matrix liquid crystal cell, receiving the light reflected by the fingerprint and exiting from one side end surface of the light guiding plate, and thus obtaining an image of the fingerprint.

According to the sixth aspect of the invention, the finger print is pinpoint-irradiated with the light through the active matrix liquid crystal cell, and the reflected light is received through the light guiding plate, whereby the image of the fingerprint can be easily obtained.

DESCRIPTION OF THE PREFERRED EMBODIMENT

An embodiment of the present invention will hereinafter be described.

Figure 1A:
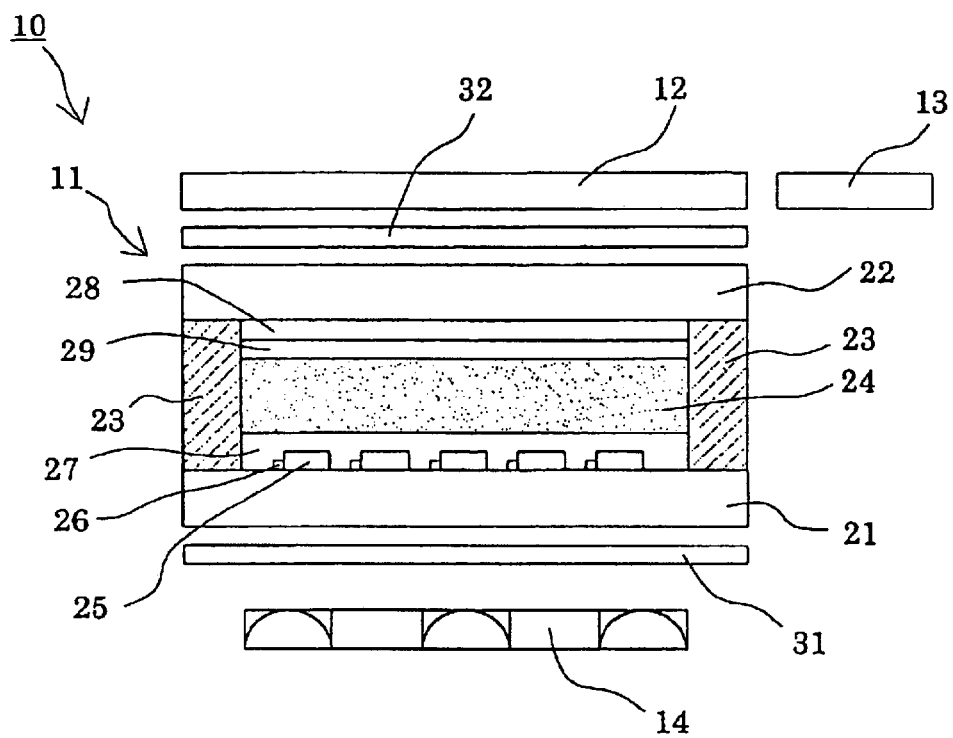
FIG. 1(a) is a sectional view showing a fingerprint reading device in one embodiment of the present invention.
Figure 1B:
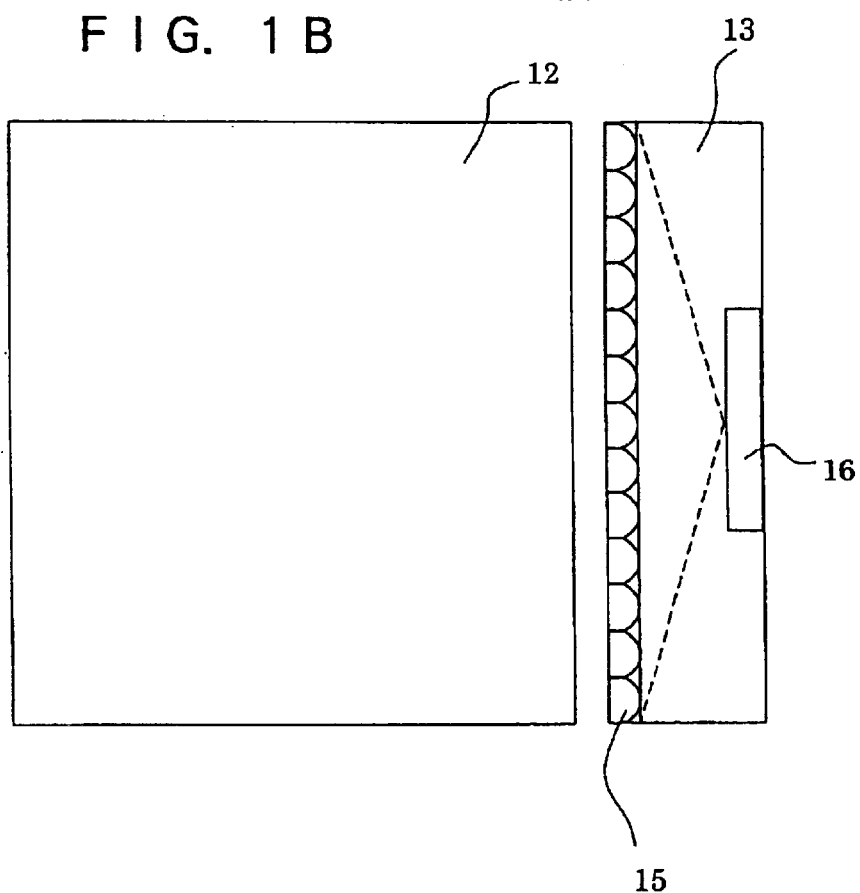
FIG. 1(b) is a plan view thereof.

FIG. 1 schematically shows a configuration of a fingerprint reading device in one embodiment.

As illustrated in FIG. 1, a finger print reading device 10 has such a geometry that a light guiding plate 12 is disposed above the surface of an active matrix liquid crystal cell 11, a light receiving device 13 is so disposed to be flush with the light guiding plate 12 on its one end side in a side-by side relation, and an illumination source 14 is disposed on the rear surface side of the liquid crystal cell 11.

Herein, the active matrix liquid crystal cell 11 takes a structure that a first transparent substrate 21 is joined to a second transparent substrate via a spacer 23, and a liquid crystal layer 24 is interposed therebetween. Further, transparent electrodes 25 and active elements 26 are arranged on the inner side of first transparent substrate 21 in a two-dimensional array corresponding to pixels in a face-to-face relation with the liquid crystal layer 24, and an orientated film 27 is provided covering these electrodes 25 and elements 26. On the other hand, on the inner side of the second transparent substrate 22, a common transparent electrode 28 and an oriented film 29 covering the surface thereof are provided above the liquid crystal layer 24. Note that polarizing plates 31, 32 are provided on the outer side of the first and second transparent substrates 21, 22.

The light guiding plate 12 functions to transmit the light emitted from the illumination device 14 toward the surface side but does not transmit the light coming from the surface side toward the rear surface side and guides this flux of light in a plane-direction, whereby the light exits from one side end surface. Further, the light receiving device 13 is constructed of a lens array 15 and a light receiving element 16 such as a photo diode. Note that the lens array 15 may be constructed as a single lens.

Further, the active element 26 is constructed of, e.g., a thin-film transistor (TFT) such as an electric field effect type insulating gate transistor. The above-mentioned active element 26 and transparent electrode 25 may be manufactured by a typical thin-film manufacturing process that has hitherto been known as in the case of a liquid crystal display device. A standard resolution of the fingerprint reading device 10 is on the order of 300 dpi at a pitch of approximately 50 $\mu$m. Note that the active element 26 is not limited to the thin-film transistor described above and may be a thin-film diode.

Figure 2A:
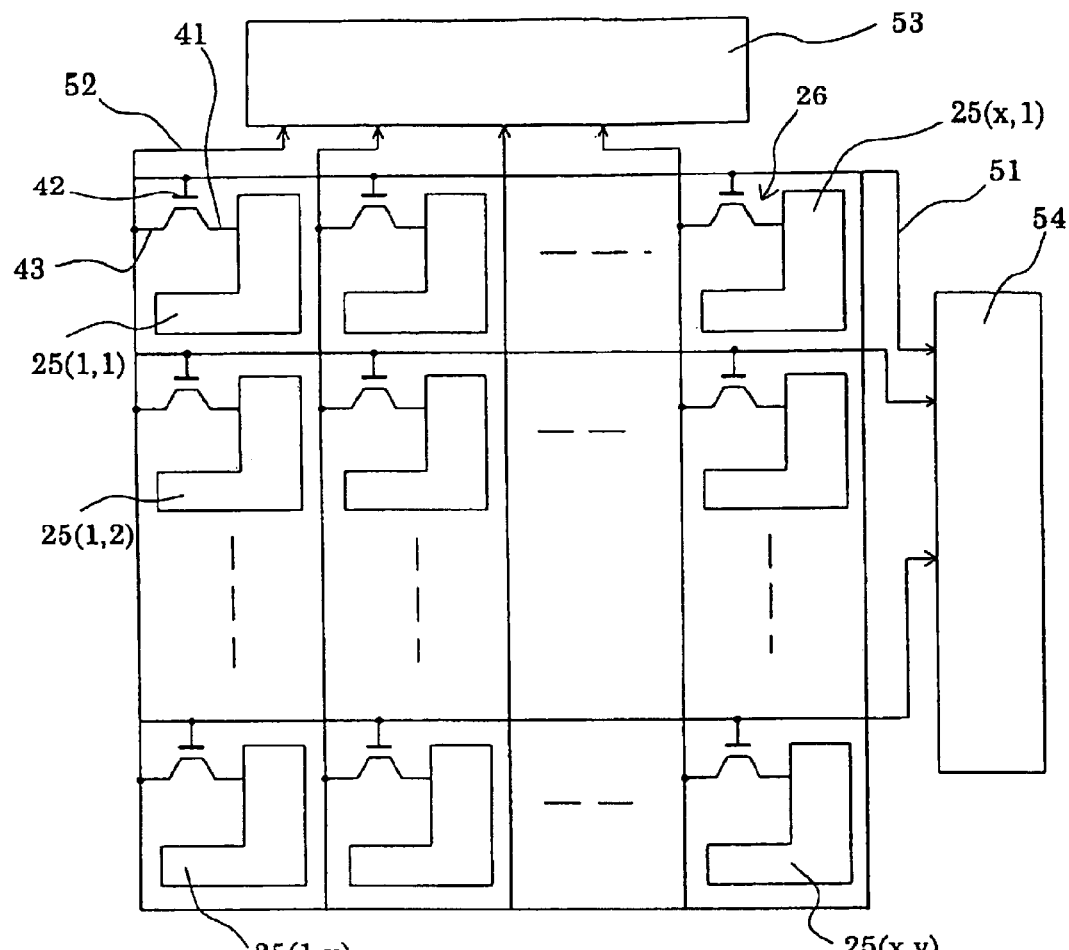
FIGS. 2(a) and 2(b) are views showing how detection electrodes of a fingerprint reading sensor of the fingerprint reading device in one embodiment of the present invention are arrayed, and how a fingerprint is read.
Figure 2B:
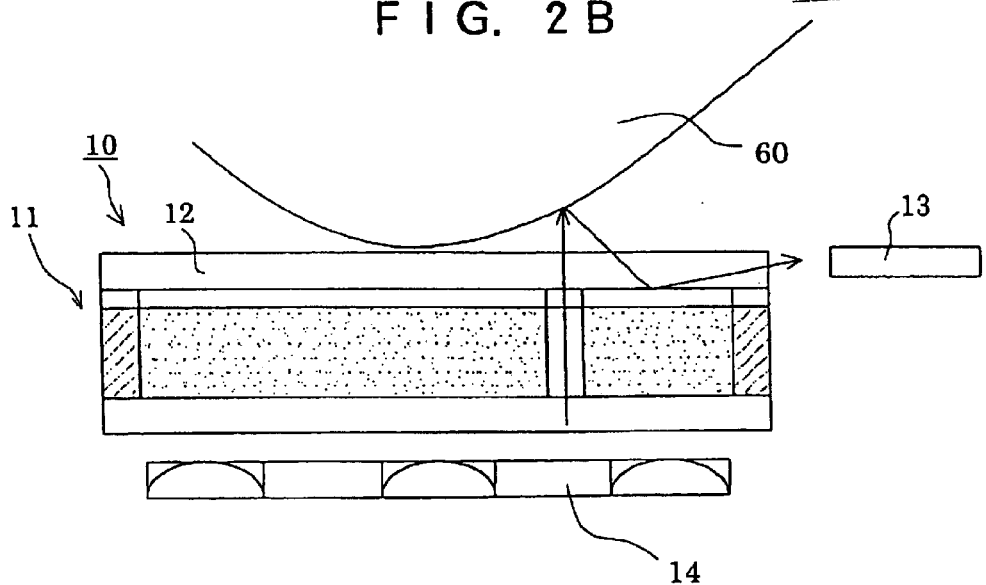

Next, steps of reading a fingerprint by use of the fingerprint reading device 10 will be briefly explained. FIG. 2(a) shows an array of the transparent electrodes 25 and the active elements 26. FIG. 2(b) schematically shows how the fingerprint is read.

As shown in FIG. 2(a), a source electrode 41 of the transistor serving as the active element 26 is connected to the transparent electrode 25. A gate electrode 42 is connected to a scan line 51. A drain electrode 43 is connected to a signal line 52. A plurality of signal lines 52 are arranged so that the drain electrodes 43 of the respective transistors are connected in series in the X-axis direction. The signal lines 52 are connected to an X-axis driver 53. Further, a plurality of scan lines 51 are arranged so that the gate electrodes 42 of the respective transistors are connected in series in the Y-axis direction. The respective scan lines 51 are connected to the Y-axis driver 54.

Thus, the transparent electrodes 25 are in a state of active addressing via the respective active elements 26. The transparent electrodes 25 are connected to x-pieces of signal lines 52 connected to an X-axis driver 53 and to y-pieces of scan lines 51 connected to a Y-axis driver 54, and have addresses (1, 1) - (x, y).

When detecting the fingerprint, to start with, the X-axis driver 53 selects a predetermined signal line 52 and applies a predetermined voltage to a gate electrode 42, in which state a voltage is applied to the active elements 26 arranged in one row through the scan lines 51. The active elements 26, which have been selected after the predetermined voltage has been applied to the gate electrodes 42, are thereby selected one by one in sequence. The liquid crystal layer 24 in an area facing the selected transparent electrodes 25 for one pixel is oriented, and transmits the light emitted from the illumination device 14.

FIG. 2(b) shows a state at that time. To be more specific, only the selected transparent electrodes 25 for one pixel become transparent, and a finger 60 is thereby illuminated with the light from the illumination device 14. On the other hand, the light reflected by the finger 60 is deflected at a boundary on the rear surface side of the light guiding plate 12, and guided in the plane-direction. The thus guided light is received by the light receiving device 13 provided on one side surface in the side-by-side relation with the light guiding plate 12. This operation is executed with respect to all the pixels, whereby an image of the fingerprint can be obtained.

According to the fingerprint reading device 10 in the embodiment discussed above, the fingerprint can be comparatively easily detected by use of the active matrix liquid crystal cell 11 and the light guiding plate 12. Further, the thus constructed fingerprint reading device 10 takes the structure similar to the liquid crystal structure of the liquid crystal display device, and can be therefore relatively simply manufactured at a low cost. The fingerprint reading device 10 is also easily incorporated together with the liquid crystal panel into an electronic apparatus, etc. in a way of being attached to the liquid crystal display panel. Namely, the fingerprint reading device described above may easily be incorporated into a variety of electronic apparatuses each having the liquid crystal display device, such as various personal computers, mobile terminals, mobile telephones, personal handyphone systems (PHS) and display-attached cards.

A variety of forms can be conceived in terms of enhancing a handleablity when incorporating the fingerprint reading device being thus integral with the liquid crystal panel into the electronic apparatus and saving the installation space. That is, if a resolution of the liquid crystal cell of the liquid crystal display device is almost coincident with that of the fingerprint reading device, the liquid crystal cell and the illumination device and the like can be used completely in common, thereby making it feasible to reduce to a considerable degree the costs of the fingerprint reading device.

Moreover, the fingerprint reading device may be provided in superposition on a part or the whole of the display area of the liquid crystal panel. In this case, for instance, some of the components such as the illumination device, the polarizing plate and so on may be used in common, whereby the costs can be reduced and the installation space can be saved. The fingerprint reading sensor described above is manufactured separately from the thin-film manufacturing process of the liquid crystal panel but may also be manufactured by the same thin-film manufacturing process. Note that the thus constructed fingerprint reading device may be disposed, without being limited to a specific position in the plane-direction of the liquid crystal display area, at a corner or central portion of the display area, and further the whole display area may also be utilized as the fingerprint reading sensor.

It is to be noted that the light receiving device is constructed of the lens array and the light receiving element in the embodiment discussed above, and may also be constructed as a line sensor provided extending along the whole of one side end surface of the light guiding plate. In this case, the light may be received per pixel as in the embodiment discussed above or received per row of pixels depending on a performance of the light guiding plate.

As discussed above, the present invention exhibits effects in which the image of the fingerprint can be read by use of the active matrix liquid crystal cell and the light guiding plate, and it is also possible to easily incorporate the fingerprint reading device into the liquid crystal display device, enhance the versatility when actually used, increase the productivity and reduce the costs.

What is claimed is:

1. A fingerprint reading device comprising:
   an active matrix liquid crystal cell having a front surface and a rear surface opposing the front surface;
   an illumination source for projecting a light from the rear surface to the front surface of the active matrix liquid crystal cell;
   a light guiding plate on the front surface of the active matrix liquid crystal cell for transmitting the light projected through the active matrix liquid crystal cell to a person's finger in contact with a front surface of the light guiding plate and light reflected from the finger is transmitted into the light guiding plate and reflected from a rear surface of the light guiding plate toward a side end surface of the light guiding plate,
   light receiving means on the side end surface of the light guiding plate for receiving the reflected light exiting from the side end surface of the light guiding plate; and
   a drive circuit for driving the active matrix liquid crystal cell to pinpoint-irradiate a fingerprint of the finger in contact with the light guiding plate by pinpointing with the light emitted from the illumination source and causing the light receiving means to pinpoint-receive the light reflected by the fingerprint to thereby obtain an image of the fingerprint.

2. A fingerprint reading device according to claim 1; wherein the active matrix liquid crystal cell comprises a liquid crystal cell of a liquid crystal display device.

3. A fingerprint reading device according to claim 1; wherein the active matrix liquid crystal cell is provided in superposition on at least a part of a liquid crystal cell of a liquid crystal display device.

4. A fingerprint reading device according to claim 1; wherein the light receiving means comprises a line sensor provided along the side end surface of the light guiding plate.

5. A fingerprint reading device according to claim 1; wherein the light receiving means comprises a light receiving element and one of a lens or a lens array for converging on the light receiving element the light exiting from the side end surface of the light guiding plate.

6. A fingerprint reading device according to claim 1; wherein the active matrix liquid crystal cell has a matrix of transparent electrodes driven by thin film switching elements.

7. A fingerprint reading device according to claim 6; wherein the thin film switching elements comprise one of thin film transistors, insulated gate field effect transistors, and thin film diodes.

8. A fingerprint reading device according to claim 1; wherein the active matrix liquid crystal cell has a resolution of about 300 dpi and a pitch between adjacent pixels of about 50 $\mu$m.

9. A fingerprint reading device according to claim 1; wherein the side end surface of the light guiding plate is disposed at a right angle with respect to the front and rear surfaces of the active matrix liquid crystal cell.

10. A fingerprint reading method comprising the steps of:
    providing an active matrix liquid crystal cell;
    providing illuminating means for projecting light from a rear surface of the active matrix liquid crystal cell;
    providing a light guiding plate on a front surface of the active matrix liquid crystal cell opposite the rear surface for receiving the light coming from the rear surface and reflecting on a rear surface of the light guiding plate toward a side end surface of the light guiding plate light that enters the light guiding plate from a front surface thereof and that is directed toward the rear surface;
    selectively pinpoint-irradiating a finger touching a front surface of the light guiding plate through the active matrix liquid crystal cell with the light projected from the rear surface of the active matrix liquid crystal cell;
    receiving the light reflected from the finger touching the front surface of the light guiding plate toward the rear surface of the light guiding plate and further reflected from the rear surface of the light guiding plate towards a side surface of the light guiding plate and exiting from the side end surface of the light guiding plate; and
    using the received light reflected by the finger from the side end surface of the light guiding plate to obtain an image of a fingerprint of the finger.

11. A fingerprint reading device comprising: a liquid crystal cell having a plurality of separately addressable pixels, a front surface and a rear surface opposite the front surface;
    an illumination device for projecting light from behind the rear surface through the front surface of the liquid crystal cell;
    a light guiding plate having opposed front and rear surfaces and a side end surface, the light guiding plate being disposed over the liquid crystal cell with the rear surface of the light guiding plate facing the front surface of the liquid crystal cell so that light projected through the liquid crystal cell is transmitted through the light guiding plate and illuminates a person's finger in contact with the front surface of the light guiding plate and light reflected from the finger is transmitted into the light guiding plate and reflected from the rear surface thereof toward the side end surface;
    a light receiving device for receiving the reflected light exiting from the side end surface of the light guiding plate; and
    a drive circuit for sequentially driving the pixels of the liquid crystal cell to project light from the illumination device onto the finger so that an image of a fingerprint of the finger can be obtained based on the reflected light.

12. A fingerprint reading device according to claim 11; wherein the liquid crystal cell comprises an active matrix liquid crystal cell.

13. A fingerprint reading device according to claim 11; wherein the light receiving device is disposed adjacent to the side end surface of the light guiding plate for receiving the reflected light.

14. A fingerprint reading device according to claim 11; wherein the light receiving device comprises a light receiving element and one of a lens and a lens array for converging on the light receiving element the reflected light exiting from the side end surface of the light guiding plate.

15. A fingerprint reading device according to claim 14; wherein the drive circuit controls the liquid crystal cell by sequentially activating respective pixels thereof so that the light emitted by the illumination device is irradiated onto the finger pixel-by-pixel and light reflected by the finger is received by the light receiving device so that an image of the fingerprint can be obtained.

16. A fingerprint reading device according to claim 11; wherein the light receiving device comprises a line sensor provided along the side end surface of the light guiding plate.

17. A fingerprint reading device according to claim 11; wherein the side end surface of the light guiding plate is disposed at a right angle with respect to the front and rear surfaces of the liquid crystal cell.

18. A fingerprint reading device according to claim 11; wherein the liquid crystal cell comprises a liquid crystal cell of a liquid crystal display device.

19. A fingerprint reading device according to claim 11; wherein the liquid crystal cell is an active matrix liquid crystal cell comprising a first transparent substrate, a second transparent substrate, a spacer joining the first and second transparent substrates so that a gap is formed therebetween, a layer of liquid crystal material filled in the gap, and a plurality of pixel elements arranged in a matrix for altering the light transmission characteristics of the liquid crystal material.

20. A fingerprint reading device according to claim 19; wherein the pixel elements comprise a transparent electrode and an active switching element formed on one of the transparent substrates facing the liquid crystal material layer.

21. A fingerprint reading device according to claim 11; wherein the liquid crystal cell is an active matrix liquid crystal cell superimposed on a liquid crystal cell of a liquid crystal display device.

22. A fingerprint reading device according to claim 11; wherein the liquid crystal cell has a matrix of transparent electrodes driven by thin film switching elements.

23. A fingerprint reading device according to claim 22; wherein the thin film switching elements comprise one of thin film transistors, insulated gate field effect transistors, and thin film diodes.

24. A fingerprint reading device according to claim 11; wherein the liquid crystal cell has a resolution of about 300 dpi and a pitch between adjacent pixels of about 50 $\mu$m.

25. A fingerprint reading method comprising the steps of;

providing a liquid crystal cell;

providing a light guiding plate on a front surface of the liquid crystal cell;

selectively pinpoint-irradiating a finger touching a front surface of the light guiding plate by projecting light in a first direction serially through the liquid crystal cell and the light guiding plate;

using the light guiding plate to guide light reflected by the finger touching the front surface of the light guiding plate toward a rear surface of the light guiding plate in a second direction generally transverse to the first direction and further reflecting the reflected light from a rear surface of the light guiding plate toward a side end surface thereof; and using the reflected light exiting from the side end surface of the light guiding plate to obtain an image of a fingerprint of the finger.

26. A fingerprint reading method according to claim 25; wherein the step of providing a light guiding plate comprises providing a light guiding plate having parallel opposed front and rear surfaces with the rear surface thereof disposed on the front surface of the liquid crystal cell.

27. A fingerprint reading method according to claim 26; wherein the side end surface of the light guiding plate is disposed at a right angle with respect to the front and rear surfaces of the liquid crystal cell.

28. A fingerprint reading method according to claim 25; wherein the side end surface of the light guiding plate is disposed at a right angle with respect to the front and rear surfaces of the liquid crystal cell.

* * * * *